(12) United States Patent
Sauermann

(10) Patent No.: US 7,124,148 B2
(45) Date of Patent: Oct. 17, 2006

(54) USER-FRIENDLY SEARCH RESULTS DISPLAY SYSTEM, METHOD, AND COMPUTER PROGRAM PRODUCT

(75) Inventor: Volker Sauermann, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 482 days.

(21) Appl. No.: 10/630,921

(22) Filed: Jul. 31, 2003

(65) Prior Publication Data

US 2005/0027694 A1   Feb. 3, 2005

(51) Int. Cl.
*G06R 17/30* (2006.01)
(52) U.S. Cl. .................................. 707/103 R
(58) Field of Classification Search ............. 707/1–10, 707/100–104.1, 200–206
See application file for complete search history.

(56) References Cited

U.S. PATENT DOCUMENTS

2002/0194208 A1* 12/2002 Knoll et al. ............... 707/204
2003/0212665 A1* 11/2003 Patitucci ...................... 707/3

\* cited by examiner

*Primary Examiner*—Diane D. Mizrahi
(74) *Attorney, Agent, or Firm*—Finnegan, Henderson, Farabow, Garrett & Dunner, L.L.P.

(57) ABSTRACT

If search result records from a database search have an attribute that at least two of the search result records share, but which was not used in the query, then categories are created to correspond to values of the shared attribute. The categories can be displayed in a user-friendly manner, as can a list of the search result records associated with a selected category.

14 Claims, 7 Drawing Sheets

Excite Search [ford mustang]

1. FordDirect.com - Get Ford Price Quotes
Ford Motor Company and your local Ford dealer have teamed up to help you buy your next Ford Mustang. Register to request a price quote and a local dealer will contact you.
http://www.forddirect.com (Sponsored Result) | Overture 2. Get a Free Ford Mustang Quote
Get a free Ford Mustang quote from a local dealer with Yahoo! Autos. Choose a vehicle, enter your contact info and a local dealer will contact you with a great no-haggle price.
http://autos.yahoo.com (Sponsored Result) | Overture 3. A New Car Buyers Must See! (Invoices)
Discover the wholesale price of any new auto! As well as special deductions from factory invoice. Find incentives, "holdback", and potential hidden dealership fees!
http://www.buyingadvice.com (Sponsored Result) | Overture 4. Find Your Ford Mustang at Autoweb
Find everything you need to purchase, sell or maintain an automobile at Autoweb.com. Get free, no haggle pricing and purchase your next vehicle through an Authorized Autoweb Dealer today.
http://www.autoweb.com (Sponsored Result) | Overture 5. How To Buy A Ford Mustang, Avoid Scams
Free, well-written consumer advocate site, the best of its kind. Dealer scams, negotiating tips, dealer cost, buying, selling used cars, inof on financing, leases, Excel spreadsheets.
http://www.carbuyingtips.com (Sponsored Result) | Overture. Findwhat 6. MustangWorks.com: The Internet's Ford Mustang Power Source!
...Erin Clark's Sweet 2003 Mach I Mustang. Please be sure to visit our feature archives ... Lyn & Rob Walter's 2001 Mustang GT. 2001 Mustang GT ......
http://www.mustangworks.com/ (Non-Sponsored Result) | Goggle, Ask Jeeves, Inktomi, LookSmart Reviewed Sites 7. StangNet.com - Promoting the Legend of the Ford Mustang
...MRT's new exhaust component is the only stainless steel H-pipe available on the market for the 1999-2004 Ford Mustang. Constructed...
http://www.stangnet.com/ (Non-Sponsored Result) | Goggle, Ask Jeeves, Inktomi, LookSmart Reviewed Sites 8. New Ford Mustang
Save Hundreds or Thousands with our fast and free price quotes!
http://www.InvoiceDealers.com/ (Sponsored Result) | MetaSearch Picks Search results for "ford mustang"   (1-8 of 85)   Page: 1-2-3 ... next

Fast Product Search white, 230 V, 2..20 kg, 100..600 Euro    [ Go ]

[ Create ] [ Save ] [ Remove from Favorites ] [ Fact Sheet ]

| Crt Screen | Flat Screen | Lamp | Scanner |

Found 26 Items ▲▼  Range  1  of 3

| Product ID | Description | Manufacturer | Screen Diagonal (Inch) | Color | Weight (kg) |
|---|---|---|---|---|---|
| 1234-56 KXU 19 | CRT Screen | Phillips | 17 | white | 13,5 |
| 1234-56 KXU 20 | CRT Screen | Phillips | 19 | white | 13,8 |
| 1234-56 KXF 10 | CRT Screen | Samsung | 17 | white | 15,3 |
| 1234-56 KXF 15 | CRT Screen | Samsung | 19 | white | 17,1 |
| 1234-56 KXL 09 | CRT Screen | Sony | 17 | white | 15,1 |
| 1234-56 KXL 29 | CRT Screen | Sony | 19 | white | 17,5 |
| 1234-56 KXL 03 | CRT Screen | Sony | 21 | white | 18,9 |
| 1234-56 KXA 17 | CRT Screen | Toshiba | 17 | white | 14,6 |
| 1234-56 KXA 25 | CRT Screen | Toshiba | 19 | white | 16,9 |
| 1234-56 KXA 27 | CRT Screen | Toshiba | 21 | white | 18,3 |

USER-FRIENDLY SEARCH RESULTS DISPLAY SYSTEM, METHOD, AND COMPUTER PROGRAM PRODUCT

DESCRIPTION OF THE INVENTION

1. Field of the Invention

This invention relates to user-friendly interfaces for the display of search results, and more particularly, to the display of search results by logical categories depicted as user-selectable tabs.

2. Background of the Invention

A database may be thought of as a structured collection of persistent data. A relational database, for example, is a database in which the persistent data is typically organized as a collection of tables related to each other through common relationships. A table (also called an entity or relation) is a logical grouping of related data in tabular form, i.e., a collection of rows and columns. A row (also called a record or tuple) represents a collection of information about a separate item (e.g., a customer). A column (also called a field or attribute) represents the characteristics of an item (e.g., the customer's name or phone number). An attribute's information is represented by a value. A value may be a text string, number, data structure, or other representation or data that conveys information about the characteristics of an item. If there is no information about an item for a given attribute, the attribute may contain a null value. A relationship is a logical link between two tables.

Database users typically employ search engines to retrieve and present the structured data from databases. As shown in FIG. 1, in response to a user query 110, a conventional search engine presents the search results to the user in the form of a list 120 or a table on a computer display 100. The items in list 120 are typically ranked by order of relevance to the user's query, without any direct indication to the user as to the criteria used to determine relevance. For example, to generate the results in FIG. 1 the user has entered the search criteria "ford mustang," and the search engine has displayed a list of web pages ranked 1–85 that contain information related to "ford mustang." Only the first eight items in the list 120 fit on display 100. The display has an indicator 130 of the total number of items in the list, and an indicator 140 that allows users to display the list page-by-page and jump to a different page. This form of presentation may be sufficient for search results that include only a small volume of data (for example, a list composed entirely of eight data records that fits onto a single page) and for search results (e.g., records or rows) that are essentially homogenous, i.e., search results comprising rows from tables having essentially the same attributes or columns.

A problem arises, however, if a search returns a large volume of data, especially heterogeneous data, because the presentation of such data is often difficult to comprehend and navigate. For example, the list shown in FIG. 1 contains 85 items or records. As shown by the page selection indicator 140, the list continues on several more pages, but the user cannot determine anything about the data on the additional pages without viewing them. The item of most interest to the user might be $85^{th}$ in the list, but without any indication of how relevance was determined, how items in the list relate to each other, how items in the list differ from each other, or what type of information each item contains, the user has no choice but to investigate the list page-by-page and item-by-item.

A sophisticated user may be able to narrow the query 110 by adding additional search terms and then rerun the search, thus potentially reducing the number of items in the list returned by the new search. This approach, however, increases the risk of eliminating from the search results an item of interest to the user that does not exactly match the additional search terms entered. In addition, this option may not be available to an unsophisticated user who cannot formulate a narrower query.

Figure 2:
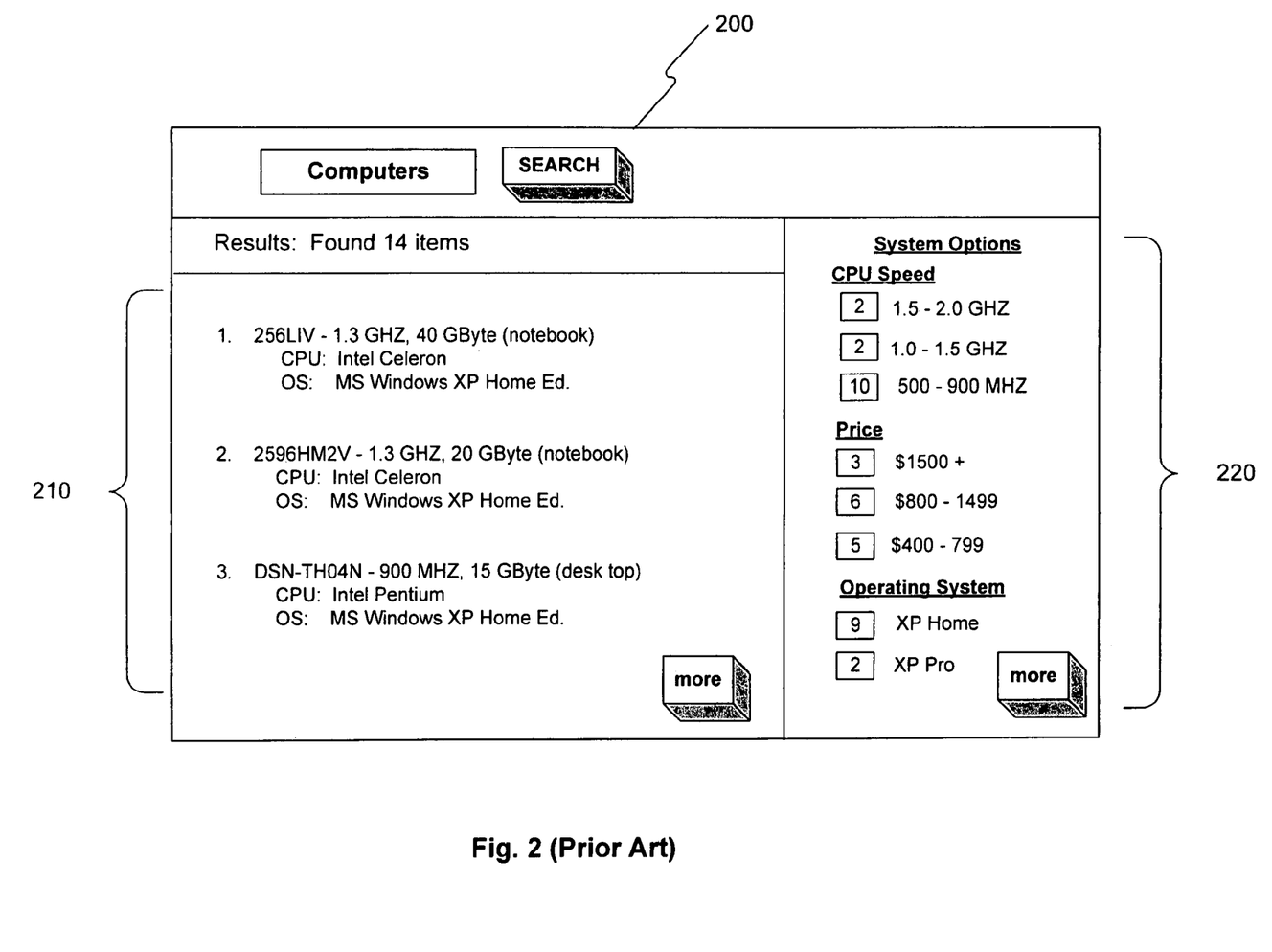
FIG. 2 is another conventional example of search results displayed in a typical list format with a predetermined list of categories added.

Although FIG. 1 shows an internet search engine results display, the same shortcomings are characteristic of ordinary business database search result displays, for example product inventory database search results, and other database search result displays. FIG. 2 shows a display 200 with a variation of the list or table format of displaying search results to a user. In FIG. 2, a typical relevance-ranked ranked list 210 appears on the left of the display 200, and a list of predetermined categories 220 appears on the right side of the display 200. In addition to being displayed in the list 210, the search results from the list are grouped into the appropriate predetermined categories 220. A user may select a category 220 and thus display only those items from the list 210 that belong to the selected category. This display method may not meet a user's needs, however, because application designers choose the categories, and the categories may not coincide with the user's needs or the data's characteristics. In addition, this display method wastes screen space by putting the categories in a list-like format down the side of the screen. Also, this display method is slow and resource intensive because it typically conducts a new search using the predetermined category to narrow the search query, then displays the new search results to the user.

Another conventional technique for displaying search results is to display a pop-up dialog box that asks which predefined subset of search results to display. This technique, however, has at least two disadvantages: First, it is difficult to navigate back and forth between the result subsets using a dialog box because all the subset choices are not presented to the user all the time. Second, navigating between subsets requires at least two steps, one step to make the dialog box appear, and another step to select the desired subset.

Yet another conventional technique for displaying search results is to put the results in the form of a tree structure. This technique also has at least two disadvantages. First, it uses all the screen space to display the subsets that form the tree without displaying any record data, which is what the user is truly interested in. Second, it requires the user to take at least two steps to display the contents of the search result records, one step to display the tree, and a second step to display a selected node of the tree.

SUMMARY OF THE INVENTION

A method for presenting a plurality of search result records from a query consistent with this invention comprises: identifying an attribute, that was not used in the query, as shared by multiple search result records; creating a category corresponding to a value of the identified attribute; displaying the category; and displaying a list of the search result records associated with the category with the display of the category.

A system for presenting a plurality of search result records from a query consistent with this invention comprises: means for identifying an attribute, that was not used in the query, as shared by multiple search result records; means for creating a category corresponding to a value of the identified attribute; means for displaying the category; and means for displaying a list of the search result records associated with the category with the display of the category.

A computer program product for presenting a plurality of search result records from a query consistent with this invention comprises code for causing a processor to perform the steps of: identifying an attribute, that was not used in the query, as shared by multiple search result records; creating a category corresponding to a value of the identified attribute; displaying the category; and displaying a list of the search result records associated with the category with the display of the category.

BRIEF DESCRIPTION OF THE DRAWINGS

FIG. 1 is a conventional example of search results displayed in a typical list format;

DESCRIPTION OF THE EMBODIMENTS

The following paragraphs describe implementations consistent with the invention. These implementations are merely examples and are not intended to limit the scope of the claims except if indicated explicitly below. Wherever needed, the same reference numbers will be used throughout the drawings to refer to the same or like parts.

Systems and methods consistent with the present invention automatically categorize search results according to common attribute values of the search results, and display the categories, for example as labels on a row of tabs. Selecting a category (such as by clicking on a tab) presents a list of data rows that have attribute values consistent with the category.

Figure 3:
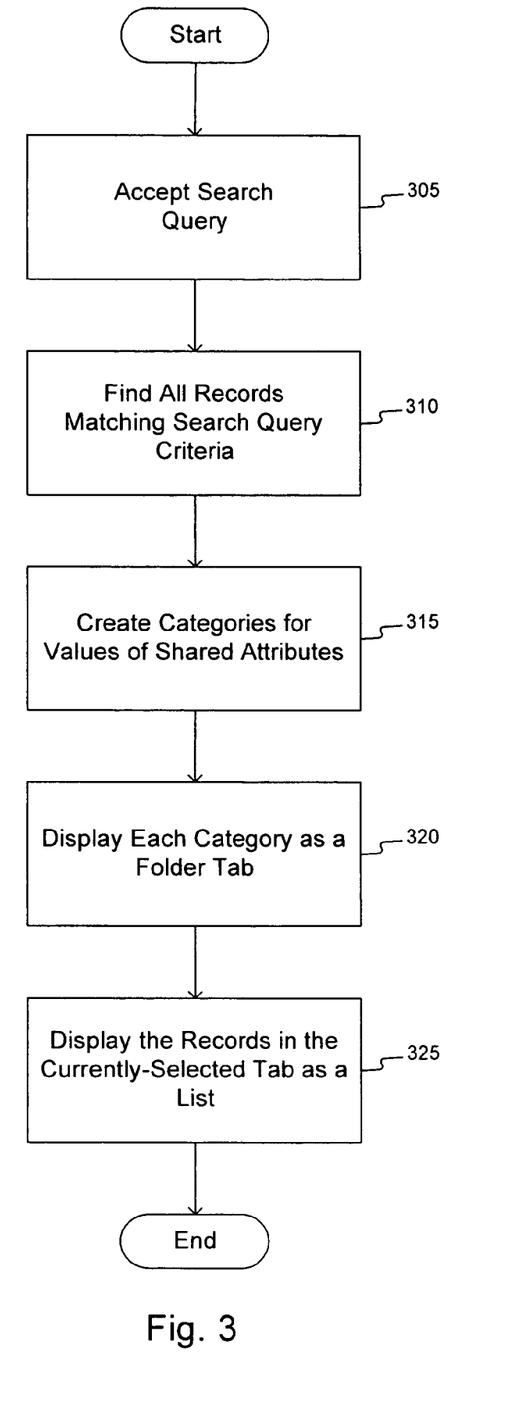
FIG. 3 is a flow chart illustrating a process for generating a display of results consistent with the present invention.

FIG. 3 is a flow chart illustrating one embodiment of a process, carried out by a computer, for generating a user-friendly results display consistent with the present invention. The process accepts a search query (step 305). A user typically provides a word or words to specify the data that the user wishes to retrieve from a database. For example, in FIG. 1, the words "ford" and "mustang" formed the search query to retrieve data related to the Ford Mustang automobile.

Next, the process finds all database records with an attribute value that matches the search query criteria (step 310). This search typically involves multiple tables in a relational database, and may involve multiple databases. It may also include data that is not stored in a traditional database. The matching records can be retrieved and cached for further processing.

As used in this application, the terms "attribute" and "column" have a broader meaning than the common meaning from the database arts. In this application, attribute and column refer generally to any data that gives information about other data, i.e., metadata. Attribute is not limited to the formal database meaning of a column in a row. For example, web pages typically contain meta tags that contain information about how, when, and by whom the web page's data was collected, and about how the web page data is formatted. As used in this application, the terms attribute and column encompass meta tag information and other metadata. Also as used in this application, the term "value" means any representation or data that conveys information about an attribute. For example, for an internet domain attribute, the value may be a text string containing the characters ".com" or the characters ".org"; for a price attribute, the value may be a floating point number representing price in dollars; for an temperature range attribute, the value may be a range of integers or two integers representing a maximum temperature and a minimum temperature in degrees Fahrenheit.

Next, the process creates categories for the retrieved records based on the values of attributes that the records share (step 315). The process looks at the names of the attributes of the retrieved records to determine which attributes are shared—if the same attribute is found in two different records or in metadata from two different sources, then the attribute can be considered shared by the two records. For example, consider the case where most of the records or metadata returned from a "ford mustang" query had an attribute identified as "business type." In other words, the search result records share in common the attribute "business type." Further, suppose that the data populating the "business type" attribute among the various records consisted of the values "auto dealers," "auto mechanics," "classic autos," and "detailers." In this example, one implementation consistent with the present invention would create four categories: "auto dealers," "auto mechanics," "classic autos," and "detailers," for the retrieved records. If some retrieved records lacked the "business type" attribute or contained no value (a null value) for the attribute, the process could create a "miscellaneous" category to include them. In addition, other categories, based on the values of other attributes shared among the retrieved records, may also be created so that the retrieved records could belong to more than one category.

The process next displays each category created as a separate folder tab (step 320). Continuing the above example, the process would display four tabs labeled "auto dealers," "auto mechanics," "classic autos," and "detailers." The folder tabs present a familiar display to a user who can easily choose a desired category and thus narrow down the displayed search results by clicking on the desired category's tab. Because tabs are space-efficient and intuitive to use, the user can see all the available categories at the same time and easily navigate among them.

When a user selects a category folder tab, the database records that belong to the category are displayed as a list (step 325). If the user wishes to view a different category, he or she simply selects the appropriate tab and the list of records is displayed without the need for another database search.

Figure 4:
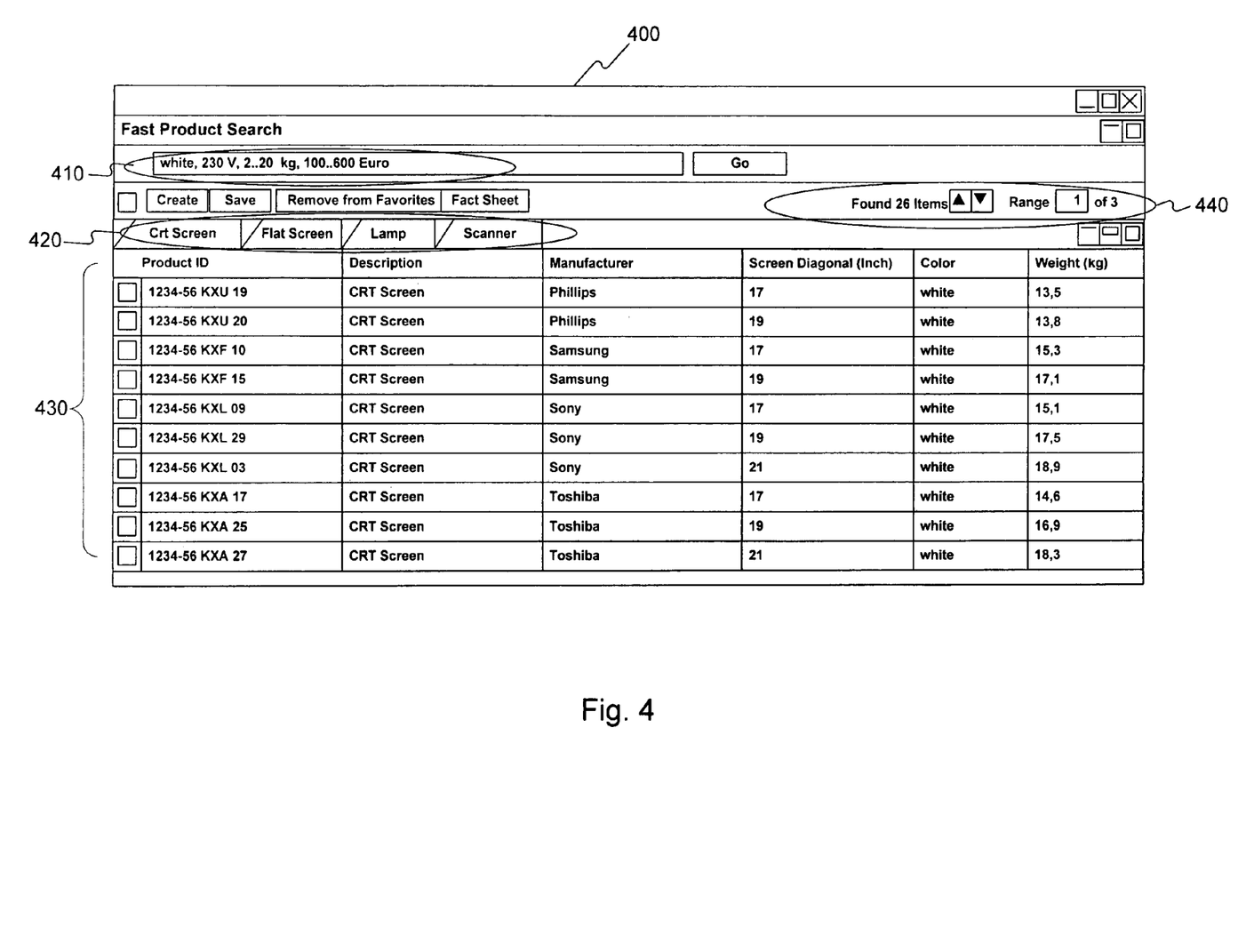
FIG. 4 is an example of a display that can be generated from the process illustrated in FIG. 3.

FIG. 4 shows an example of a display 400 consistent with the present invention such as might be produced by the process in FIG. 3. Display 400 includes a space 410 for a user to enter search criteria (see step 305 in FIG. 3). For example, a user may enter search criteria as a string of values separated by commas, for example "white, 230 V, 2 . . . 20 kg, 100 . . . 600 Euro" as shown in FIG. 4, denoting attributes of color, voltage, weight and price range that the user wishes to search for.

Once the process transforms the user's search criteria into a search query acceptable to a database management system, such as (color=white) & (voltage=230) & (weight between 2 and 20) & (price between 100 and 600) (see step 310 of FIG. 3), the system managing the database being searched retrieves matching records. One of ordinary skill in the art will recognize that the characteristics used to search for database records could be entered in a form other than a string, for example, as an integer. Similarly, one of ordinary skill will recognize that the search criteria or characteristics could come from a source other than a user, for example from an application program.

Generally, the records (rows) meeting the search criteria come from different tables and have attributes in addition to those that meet the search criteria. As FIG. 4 shows, the database records found using this search had at least one other attribute in common, the "Description" attribute, in addition to the color, voltage, weight, and price attributes used in the query. The records that matched the user's search query contained four different values for the Description attribute: "CRT Screen," "Flat Screen," "Lamp," and "Scanner." These values are used to create and organize categories for the search result data records (see step 315 of FIG. 3).

As shown in FIG. 4, the values that form the four categories are displayed as a row of folder tabs 420 on display 400 (see step 320 of FIG. 3). When a tab is selected, a list of data records 430 having the tab attribute is displayed (see step 325 of FIG. 3). Thus, each tab has a name that behaves logically as a shared attribute value for all the data rows on the tab. Each tab can present an arbitrary number of data records, using a series of pages if necessary. Although FIG. 4 shows defined values for each displayed attribute, some records may have undefined or null values for some attributes. For example, undefined attributes may be shown as blank spaces in the displayed list. In the illustrated embodiment, a tab category summary area 440 displays the total number of records associated with the tab category and the number of pages needed to display them. A user selects the category of search results to display by clicking on the appropriately labeled tab. When the search results are first revealed, a default category, for example the first category in alphabetical order, is displayed. The user may then select any other desired category to display.

One of ordinary skill in the art will realize that the tabs shown running horizontally near the top of the display in FIG. 4 could easily be rearranged to run across the bottom of the display, or to run vertically, or be put in some other arrangement. One of ordinary skill will also realize that display items other than tabs can also represent the categories. For example, labeled buttons could be arranged around a TV-screen-like display, and the user could select a category by clicking on a button to display the list of records in the category on the TV screen.

Figure 5:
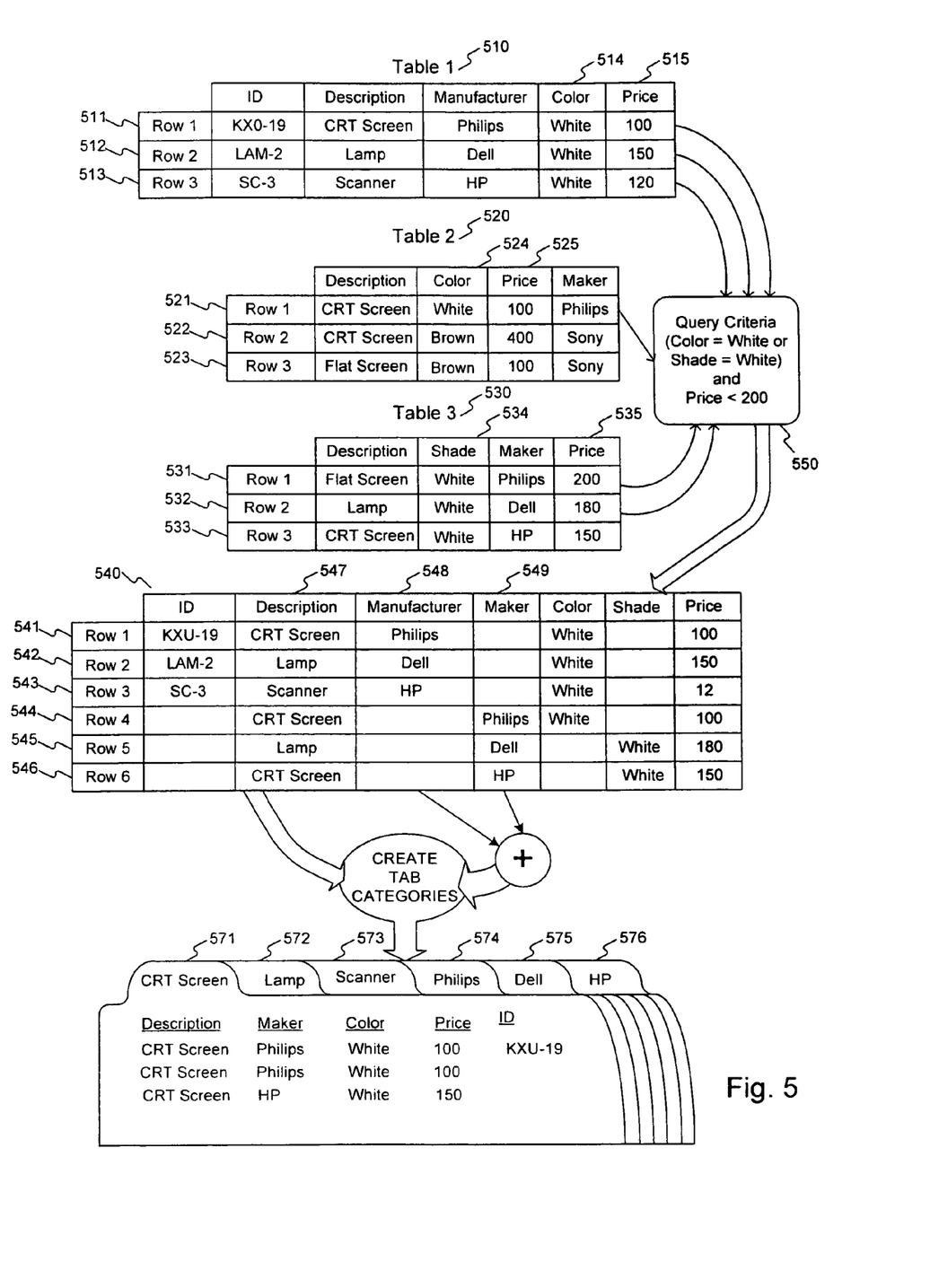
FIG. 5 is a diagram illustrating a process for gathering search results from a database consistent with the present invention.

FIG. 5 is a diagram illustrating a process for gathering search results from a database and displaying the search results consistent with the present invention. In the example shown in FIG. 5, a database management system searches three tables, 510, 520, and 530, in a relational database according to query criteria 550. Table 1 contains three records, 511, 512, and 513. Table 1 (510) includes a color attribute 514 and a price attribute 515. Table 2 (520) contains 3 records, 521, 522, and 523, and includes a color attribute 524 and a price attribute 525. Table 3 (530) contains 3 records, 531, 532, and 533, and includes a shade attribute 534 and a price attribute 535. Although FIG. 5 shows three tables 510, 520, and 530 with defined values for each attribute of all the records, the form of the databases is unimportant, and the attribute values could be undefined (e.g., null).

In one embodiment consistent with the present invention, the database management system selects all the data rows from the database containing Table 1 (510), Table 2 (520), and Table 3 (530) that meet the query criteria and saves them in a cache table or view 540. As FIG. 5 shows, the selected rows come from different tables and have several attributes (columns) in addition to (and different from) those that meet the search criteria. Some of the additional attributes are common or shared among the three tables. For example, all the selected rows have a "Description" attribute 547 in common. The selected rows from Table 2 (520) and Table 3 (530) have a "Maker" attribute 549 in common. The selected rows from Table 1 (510) have a "Manufacturer" attribute 548 that is not in common with the other two table's rows, but is directly analogous to the "Maker" attribute 549 from Table 2 (520) and Table 3 (530).

Because the "Description" attribute 547 is common to all the search result records in the cache table 540, the Description attribute values are analyzed to create categories for display of the search result records. As shown in FIG. 5, there are three distinct values for the description attribute 547, namely "CRT Screen" (for Row 1 (541), Row 4 (544) and Row 6 (546)), "Lamp" (for Row 2 (542) and Row 5 (545)), and "Scanner" (for Row 3 (543)). These values are used to label tabs 571, 572, and 573 on the user display and selection of one of the tabs will display a list of the corresponding records containing the tab-label value. For example, as FIG. 5 shows, selection of the "CRT Screen" labeled tab 571 will display a list of Row 1 (541), Row 4 (544) and Row 6 (546) from cache table 540. The computer can format the list in any manner to convey the record information to the user.

The computer can also combine different attribute values from different tables to form a single category that is considered a shared category. In one embodiment consistent with the present invention, artificial intelligence programs that, for example, learn from prior decisions by a user, can determine whether to combine categories.

FIG. 5 shows an example of combining categories. The computer analyzes the record values for the "Manufacturer" attribute 548 and the "Maker" attribute 549 to create categories "Philips," "Dell," and "HP," which are used to label tabs 574, 575, and 576. The decision whether to combine different attributes for category analysis may be preprogrammed (e.g., always combine a "manufacturer" attribute with a "maker" attribute), or it may be made dynamically based on the data (e.g., if many values of two different attributes overlap, then combine them into one category). As FIG. 5 shows, the values of the "maker" attribute 549 overlap 100% with the values of the "Manufacturer" attribute 548, as both attributes contain the values "Philips," "Dell," and "HP." In one embodiment consistent with the present invention, an overlap of 40% or more between the values of two attributes indicates that they are good candidates to combine for category analysis. In another embodiment consistent with the present invention, the computer considers other factors, such as similarity of attribute names and relationships between attribute names, when determining whether to combine attributes. In yet another embodiment consistent with the present invention, the database and data model are largely known in advance and essentially static, which allows the computer to be programmed to combine certain attributes into a single shared category by default, without further analysis of their values, names, or other factors.

One of ordinary skill in the art will recognize that FIG. 5 is not the only possible implementation consistent with the present invention. For example, the search result records produced as a result of query 550 need not be put into a cache table 540 as shown. Instead, they could be stored in a different data structure or processed directly without storage.

Figure 6:
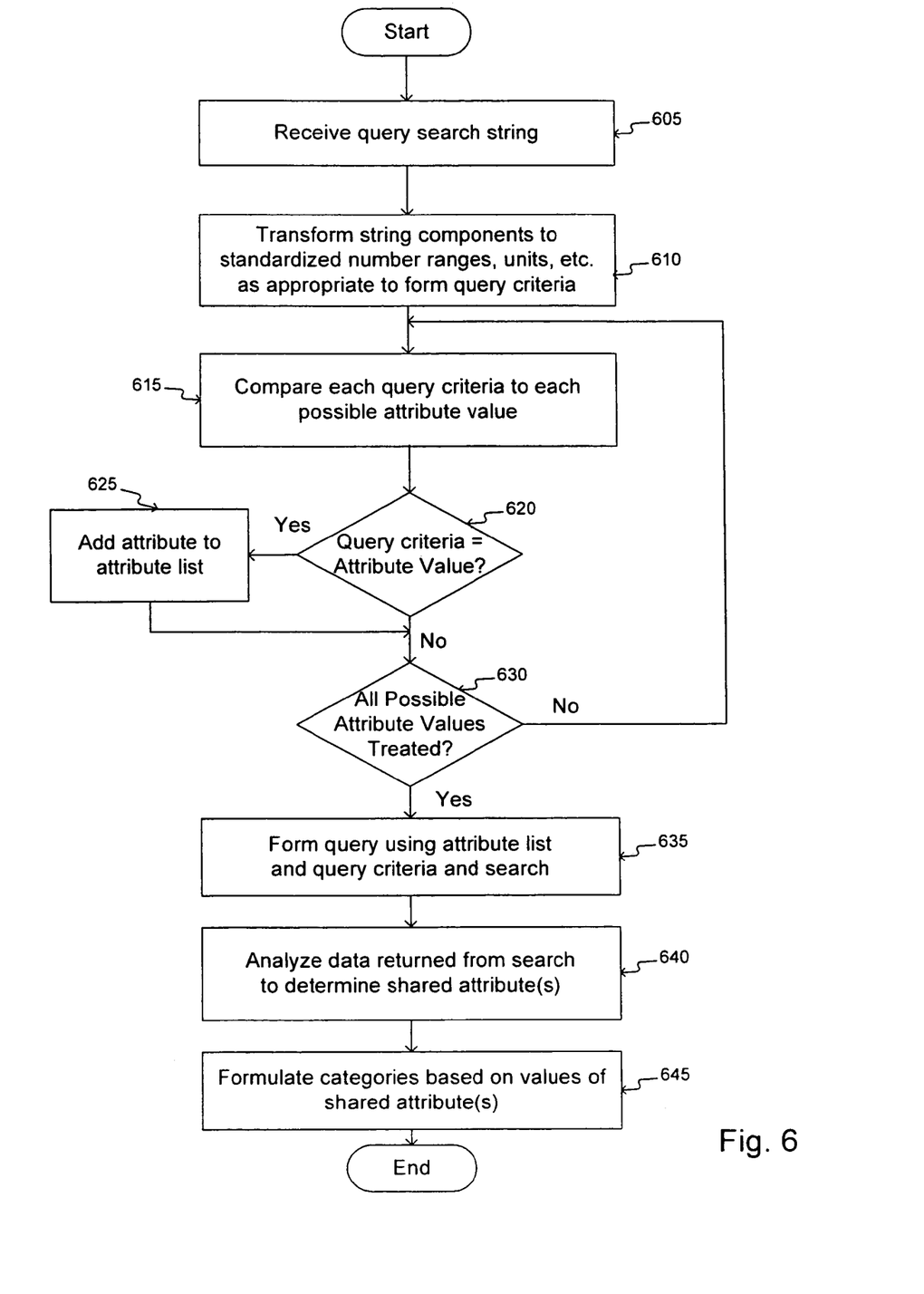
FIG. 6 is a flow chart illustrating a process for formulating search queries consistent with the principles of the present invention.

FIG. 6 is a flow chart illustrating a process for formulating queries for use in a display consistent with the present invention. The process starts by receiving a query search string, which may, as shown in FIG. 4, include values separated by a delimiter such as a comma (step 605).

The process transforms each delimited string component to standardize number ranges, units, etc, as appropriate to form a query criteria compatible with the values stored in the databases to be searched (step 610). For example, if the user enters weight as 4.4 pounds, but the database to be searched stores weight in units of kilograms, then the user input is converted from 4.4 pounds to 2.0 kilograms, and 2.0 kilograms is used as the query criteria.

Next, the process begins a loop that compares the received query criteria with the different possible defined values of the attributes over the data tables or other collections of data that are to be searched (step 615). If the query criteria match an attribute value (step 620, yes), then the relevant attribute is added to an attribute list (step 625). If the query criteria do not match an attribute value (step 620, no), then another attribute value is compared in a loop until the possible attribute values are tested (step 630). In one embodiment consistent with the present invention, the computer keeps a list of all possible attribute values separate from the underlying database so this loop can perform quickly without repeatedly accessing the database.

To search the database, the computer forms a search query by joining the attribute list built in the loop and the query criteria values (step 635). One of ordinary skill will recognize that the search can be performed by a conventional database management system once the search query is formed.

Next, the computer analyzes the database rows or records or other data returned from the search to identify attributes shared in common among the rows, other than those attributes specified in the search query (step 640).

The computer then formulates categories based on the values of the shared attributes (step 645). The categories are used for labeling folder tabs on the display and listing the search result rows belonging to each category.

Some categories may have only one or a few member data records returned from the search. One embodiment consistent with the present invention combines scarcely populated categories to form a new, more highly populated category. The new category may be labeled "Miscellaneous," or with a concatenation of the combined category names, such as "Lamp/Scanner/Flat Screen," or with some other appropriate name.

For example, referring to FIG. 4, suppose that in addition to the categories shown, the search results contained one record containing "Printer" for the value of the Description attribute, two records containing "Clock" for the value of the Description attribute, one record containing "Coffee Maker" for the value of the Description attribute, one record containing a null value for the value of the Description attribute, and one record that did not have a Description attribute (column) at all. In such a case, what might otherwise be five additional categories may be combined into one category and given a label such as "Miscellaneous." The decision whether to combine categories can be based on the total number of categories formulated from the search results, the number of tabs that can be displayed reasonably, and the relative number of data records in each category, among other factors. In one embodiment consistent with the present invention, the combination of two or more categories into a new category occurs if the sum of the number of records in the first category and the number of records in the second category is less than a predetermined threshold, such as the total number of records that fill one page on a display screen, or a certain percentage of the next-most-populated category.

Continuing the example and referring again to FIG. 4, if the CRT Screen category contained 26 records, the Flat Screen category contained 30 records, the Lamp category contained 15 records, and the Scanner category contained 17 records, then the Printer, Clock, Coffee Maker, null, and "missing" categories are good candidates to combine into a Miscellaneous category because each contains relative few records compared to the CRT Screen, Flat Screen, Lamp, and Scanner categories.

Figure 7:
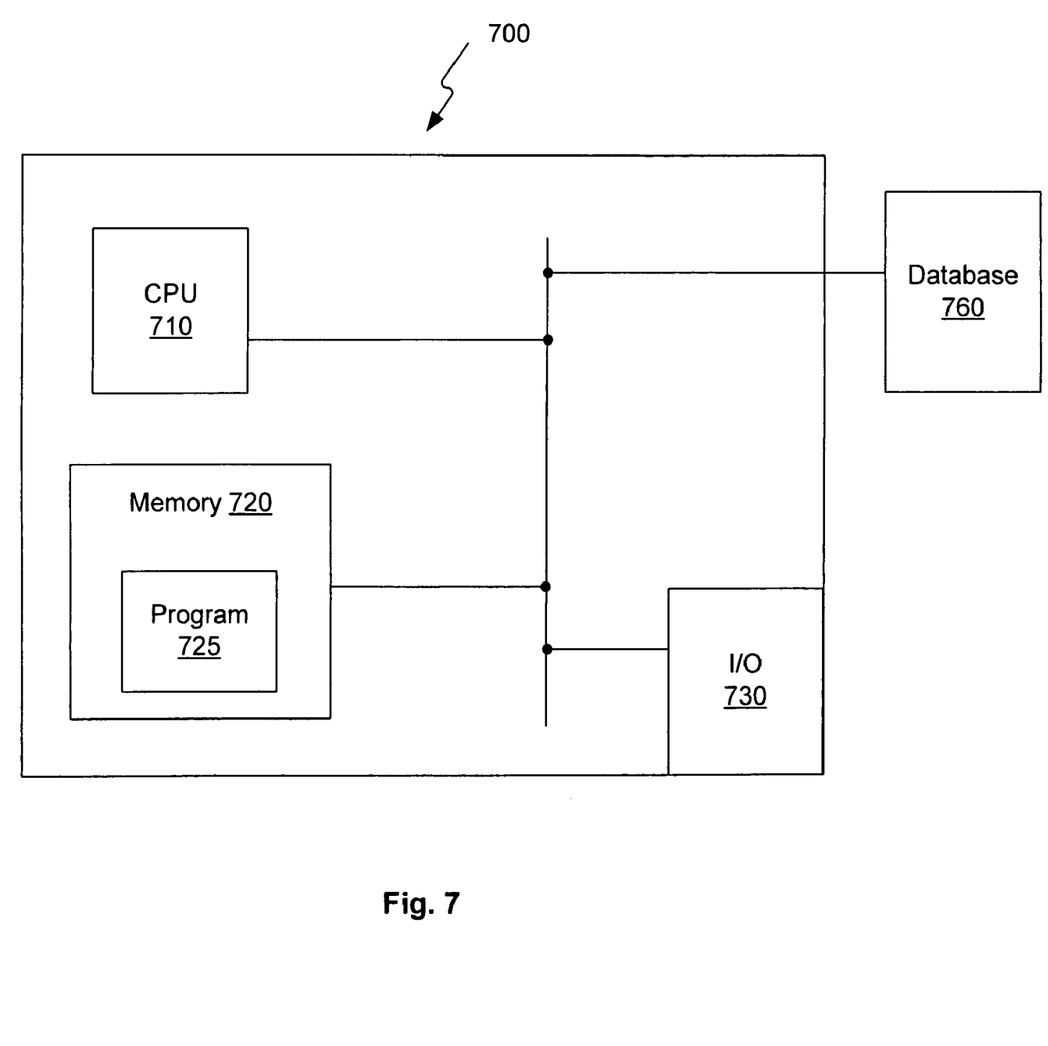
FIG. 7 illustrates an exemplary computing system with which embodiments of the invention may be implemented.

FIG. 7 illustrates an exemplary computing system 700 that can implement embodiments of the invention. The components and arrangement, however, are not critical to the present invention.

System 700 includes a number of components such as a central processing unit (CPU) 710, a memory 720, an input/output (I/O) device 730, and a database 760 that can be implemented in various ways. For example, an integrated platform (such as a workstation, personal computer, laptop, etc.) may comprise CPU 710, memory 720 and I/O device 730. In such a configuration, components 710, 720, and 730 may connect through a local bus interface and access to database 760 (implemented as a separate database system) may be facilitated through a direct communication link, a local area network (LAN), a wide area network (WAN) and/or other suitable connections.

CPU 710 may be one or more known processing devices, such as a microprocessor from the Pentium family manufactured by Intel™. Memory 720 may be one or more storage devices configured to store information used by CPU 710 to perform certain functions related to embodiments of the present invention. Memory 720 may be a magnetic, semiconductor, tape, optical, or other type of storage device. In one embodiment, memory 720 includes one or more programs that, when executed by CPU 710, perform various processes consistent with the present invention. For example, memory 720 may include a database management system program 725 that, when executed by CPU 710, determines which records associated with database 760 match a search query. Memory 720 may also include other programs that perform other functions consistent with embodiments of the invention.

Methods, systems, and articles of manufacture consistent with the present invention are not limited to programs configured to perform dedicated tasks. For example, memory 720 may be configured with a program that performs several functions when executed by CPU 710. That is, memory 720 may include a program for searching database 760 and a program for dynamically categorizing and displaying the search result records from database 760 based on the values of attributes common among the search result records. Alternatively, CPU 710 may execute one or more programs located remotely from system 700. For example, system 700 may access one or more remote programs that, when executed, perform functions related to embodiments of the present invention.

I/O device 730 may comprise one or more input/output devices that allow data to be received and/or transmitted by system 700. For example, I/O device 730 may include one or more input devices, such as a keyboard, touch screen, mouse, and the like, that enable data to be input from a user. Further, I/O device 730 may include one or more output devices, such as a display screen, printer, speaker devices, and the like, that enable data to be output or presented to a user. The configuration and number of input and/or output devices incorporated in I/O device 730 are not critical to the invention.

Database 760 may comprise one or more databases that store information and is accessed and managed through system 700. By way of example, database 760 may be an Oracle™ database, a Sybase™ database, or other relational database. Systems and methods of the present invention, however, are not limited to relational databases. Although some embodiments described above used relational databases, those skilled in the art will appreciate that embodiments of the present invention can use other types of databases, organized collections of data and memory systems.

One of ordinary skill in the art will also recognize that using conventional equipment and programming techniques, such a person could implement the embodiments described and suggested above.

The processing required to implement a result display consistent with the principles of the present invention may be greater than that required from previous search engines and display applications. For example, in an application scenario that involves hundreds of attributes and gigabytes of data, the underlying database search engine should be able to process each search request in a few milliseconds. Such speed could allow it to practically serve hundreds of users with acceptable response times. In such an application scenario, implementing the invention with a powerful engine that works on data stored in main memory (not on disk, where access times might be too long) with worst-case behavior defined as if every attribute were indexed (i.e., full index behavior), would be a good design.

Other embodiments of the invention will be apparent to those skilled in the art from consideration of the specification and practice of the invention disclosed herein. The specification and examples are exemplary only. The following claims indicate the true scope of the invention.

What is claimed is:

1. A computer-implemented method for presenting a plurality of search result records from a query comprising:
   defining a shared attribute, that was not used in the query, based on values common to a plurality of search result records,
   wherein defining includes:
      determining a first set of defined values for a first attribute,
      determining a second set of defined values for a second attribute, and
      classifying the first attribute and the second attribute as a single shared attribute if the first set of defined values and the second set of defined values share a common set of defined values;
   creating a category corresponding to a value of the shared attribute,
   wherein creating a category includes:
      determining a first number of search result records corresponding to a first category,
      determining a second number of search result records corresponding to a second category, and
      combining the first category and the second category into a new category if the sum of the first number and the second number is less than a predetermined threshold;
   displaying the category; and
   displaying a list of the search result records associated with the displayed category.

2. The method of claim 1, wherein displaying the category further comprises:
   displaying the category as a labeled tab.

3. The method of claim 1, wherein displaying the category further comprises:
   displaying the category as a labeled button.

4. The method of claim 1, wherein a search result record having a value of null for the identified attribute is associated with the category.

5. The method of claim 1, wherein combining includes:
   combining the first category and the second category into a new category if the sum of the first number and the second number are less than a third number of records in a third category.

6. A system for presenting a plurality of search result records from a query comprising:
   means for defining a shared attribute, that was not used in the query, based on values common to a plurality of search result records,
   wherein the means for defining an attribute includes:
      means for determining a first set of defined values for a first attribute,
      means for determining a second set of defined values for a second attribute, and
      means for classifying the first attribute and the second attribute as a single shared attribute if the first set of defined values and the second set of defined values share a common set of defined values;
   means for creating a category corresponding to a value of the shared attribute,
   wherein the means for creating a category includes:
      means for determining a first number of search result records corresponding to a first category,
      means for determining a second number of search result records corresponding to a second category, and
      means for combining the first category and the second category into a new category if a sum of the first number and the second number is less than a predetermined threshold;
   means for displaying the category; and
   means for displaying a list of the search result records associated with the displayed category.

7. The system of claim 6, wherein the means for displaying the category further comprises:
   means for displaying the category as a labeled tab.

8. The system of claim 6, wherein the means for displaying the category further comprises:
   means for displaying the category as a labeled button.

9. The system of claim 6, wherein a search result record having a value of null for the identified attribute is associated with the category.

10. The system of claim 6, wherein the means for combining includes:
   means for combining the first category and the second category into a new category if the sum of the first number and the second number are less than a third number of search result records in a third category.

11. A computer readable storage medium for presenting a plurality of search result records from a query comprising code for causing a processor to perform the steps of:
- defining a shared attribute, that was not used in the query, based on values common to a plurality of search result records,
- wherein defining an attribute includes:
  - determining a first set of defined values for a first attribute,
  - determining a second set of defined values for a second attribute, and
  - classifying the first attribute and the second attribute as a single shared attribute if the first set of defined values and the second set of defined values share a common set of defined values;
- creating a category corresponding to a value of the shared attribute,
- wherein creating a category includes:
  - determining a first number of search result records corresponding to a first category,
  - determining a second number of search result records corresponding to a second category, and
  - combining the first category and the second category into a new category if the sum of the first number and the second number is less than a predetermined threshold;
- displaying the category; and
- displaying a list of the search result records associated with the displayed category.

12. The medium of claim 11, wherein displaying the category further comprises:
- displaying the category as a labeled tab.

13. The medium of claim 11, wherein displaying the category further comprises:
- displaying the category as a labeled button.

14. The medium of claim 11, wherein combining includes:
- combining the first category and the second category into a new category if the sum of the first number and the second number are less than a third number of records in a third category.

* * * * *